United States Patent Office 2,739,093
Patented Mar. 20, 1956

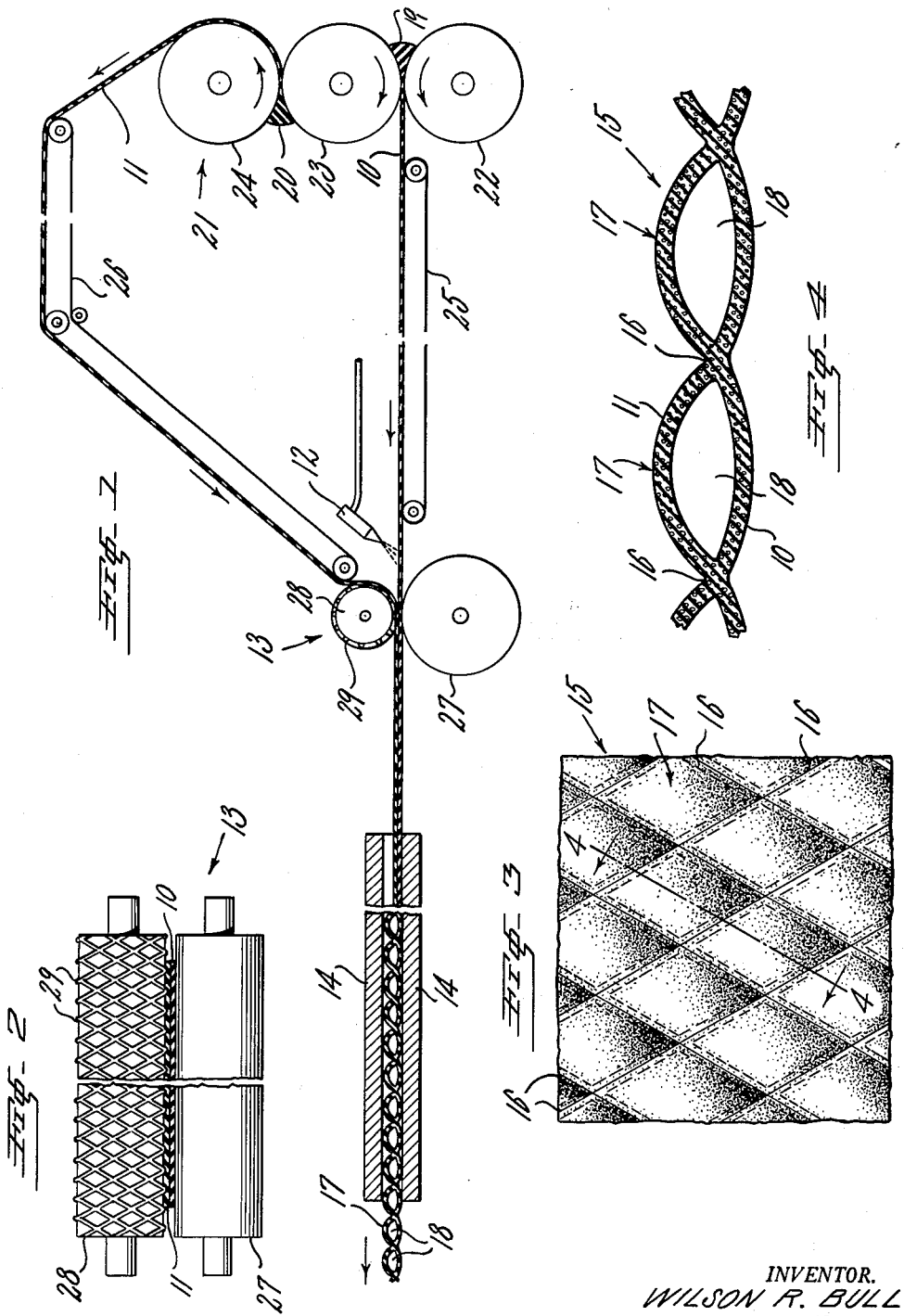

2,739,093

METHOD FOR MAKING LAMINATED TUFTED CELLULAR RUBBER SHEET MATERIAL

Wilson R. Bull, Ansonia, Conn., assignor to United States Rubber Company, New York, N. Y., a corporation of New Jersey Application January 13, 1953, Serial No. 330,970

9 Claims. (Cl. 154—106)

This invention relates to a method of making a laminated cellular sheet material having inflated tufts over its area, and to the article made by this method, and more particularly it relates to a method of making a laminated tufted rug underpadding of cellular rubber wherein two sheets of cellular rubber are joined together at spaced apart lines on their surfaces to form a laminated sheet having a tufted pattern wherein a gas is trapped between the laminae in the tufted areas to hold them spaced from each other, and to the rug underpadding made by this method.

In an effort to enhance the cushioning qualities of floor coverings and thereby to increase the wearability of the covering and the comfort of those walking thereon, floor coverings have been provided with an underpadding disposed between the covering and the floor and designed to cushion the blows which the floor covering receives in normal usage. Heretofore these underpaddings have been made of various materials such as felt, jute, etc. Cellular materials, and particularly sponge rubbers, have been found especially desirable for these rug underpaddings because sponge rubbers have a multiplicity of open gas cells trapped in the rubber (see Gould, "Cellular Rubbers," Rubber Chemistry and Technology, vol. 17, p. 943 (1944)) which permit the collapse of the underpadding under the force of a blow; yet these rubber products are sufficiently firm to cushion the blows which are inflicted on a floor covering without collapsing unduly under their impact.

The present invention contemplates an improved cellular rubber rug underpadding and method of making the same, wherein the thickness of the underpadding is materially increased without requiring a proportionate increase in the amount of cellular material used therein over the amounts used in the underpaddings heretofore made. Yet the underpadding of this invention has the necessary firmness and resiliency required in rug underpaddings, so that by using the same amount of rubber an underpadding may be made by this invention which has a more luxurious feel when used for its intended purpose than underpaddings heretofore made.

More specifically this invention contemplates a laminated tufted sponge rubber sheet material in which two or more laminae of sponge rubber are vulcanized or bonded together along spaced apart lines to define tufted design areas in the surface of the sheet, and a gas is trapped between the tufted laminae in these areas to hold the laminae separated where they are not secured together to provide tufts or mounds over the entire surface of the material. This laminated material is produced by a method in which sheets of uncured sponge stock are formed; talc and a suitable blowing agent are then dusted over one or more sides of one or more of the sheets, and the sheets are placed in juxtaposition with the talc and blowing agent sandwiched between the sheets. The talc serves to prevent these sheets of uncured stock from flowing together when one is thus placed near the other. The thus disposed sheets are then joined along spaced apart lines by pressing the sheets together with an embossing means to adhere the tacky sheet stocks to each other along these lines despite the talc between the sheets under these lines. Closed areas are thereby defined which are bounded by these lines, and within these boundaries talc and a blowing agent are trapped. This laminated sheet is then cured, and free blow takes place. During this cure, the several sheets are formed into a unitary mass along the lines of juncture, and the cellular stock is blown and cured to form a sponge rubber. At the same time, gas is evolved from the blowing agent between the sheets, and since this gas is trapped within the areas bounded by the lines of juncture of the sheets, the sheets are blown apart in these areas to present a tufted appearance.

The thickness of the sheet is thus increased materially over the thickness of an ordinary sheet of cellular material, yet the desired firmness and resiliency are secured to give a more luxurious feel to the finished laminated product, for each laminae is formed of cellular material having myriad gas cells therein, and large pockets of gas are trapped in the tufts between the laminae.

For a better understanding of this invention reference should be had to the following description, when read in conjunction with the accompanying drawing, of exemplary embodiments of a material and a method of making this material according to the present invention.

In the drawing:

Fig. 1 is a side elevational view partially in section illustrating the method of making the material according to this invention and showing one form of apparatus suitable for carrying out this method;

Fig. 2 is a view of the embossing rolls shown in Fig. 1 looking toward them in a direction opposite to the direction of material travel therethrough;

Fig. 3 is a plan view of a portion of a finished laminated sheet according to this invention, and Fig. 4, on a larger scale, is a sectional view taken substantially along the lines 4—4 of Fig. 3.

Referring now to the drawing, the method of making the laminated sheet material according to this invention is illustrated in Fig. 1. In this method, two sheets 10, 11 are formed of uncured plastic stock containing a blowing agent. Although this plastic stock is made preferably of natural or synthetic rubber, other synthetic plastic blowable materials which are well known in the plastics art may be used. Talc and a blowing agent are then dusted over one entire surface of one of the sheets by dusting means 12, such as hereinafter described. The sheets are then placed in facing relationship with the talc and blowing agent between the sheets, and the sheets are pressed together along spaced apart lines by an embossing means 13 to define surface areas in the sheets which are bounded by the lines. The sheets are subjected to a curing temperature from heating means 14 under conditions which permit free, i. e. unconfined, blow of the cellular stock in the sheets and of the sheets relative to each other. During this heating, the material is cured; gas is generated in the cellular stock to form a cellular material, and gas is generated from the blowing agent between the sheets to blow them apart in the areas bounded by the lines where they were pressed together. At the same time, the individual laminae are vulcanized into a unitary mass along these securing lines so that a unitary laminated sheet is produced having tufts formed by the gas generated between the laminae in the areas where they are not cured together.

Referring next to Figs. 3 and 4, there is shown a portion of the finished sheet of this invention. This sheet 15 is shown embossed by the spaced apart lines 16 which form a diamond design in the embodiment of the invention illustrated. It will be appreciated that other designs, such as square and hexagonal, may be used when desired. Within the lines 16, the tufts 17 are formed in which the two laminae 10, 11 are blown and held apart by the gas trapped in the areas 18 between them and bound by the lines 16. As best shown in Fig. 4, the laminae 10, 11 are cured into a unitary mass along the lines 16 to form the highly efficient unitary laminated sheet material of this invention.

The apparatus shown in Fig. 1 provides convenient means for carrying out the method of this invention. A cellular rubber stock for the sheet stock may be mixed on a conventional rubber mill or in a Banbury mixer (not shown) and conducted therefrom by suitable conveyor belts (not shown) to the banks 19 and 20 of a conventional three roll calender 21. From the bank 19, the cellular compound is passed through the nip of the rolls 22, 23 thereby to calender a sheet 10 of cellular stock, and from the bank 20, the cellular stock is passed through the nip of the rolls 23, 24 thereby to calender a sheet 11 of cellular stock. If it is desired to form the sheets 10, 11 of cellular stock by more than one pass through the calender, a suitable calender having additional rolls could be substituted for the three roll calender 21 shown in the drawing.

From the calender 21, the sheets 10, 11 are conducted by suitable conveyor belts 25, 26 to a set of embossing rolls 13. Before the sheets arrive at the embossing rolls, a mixture of talc and a blowing agent are sprayed from a gun 12 over the entire area of one surface of one of these sheets by passing the gun back and forth across the width of the advancing sheet. Although this means for applying the talc and blowing agent has been illustrated as a spray gun, it will be appreciated that other means may be employed for dusting these materials between the sheets 10 and 11. Further although it is more convenient to blow the talc and blowing agent between the sheets in a single operation, it will be appreciated that a plurality of dusting means may be employed in which one is utilized for the blowing agent and the other is utilized for the talc alone.

As heretofore described, the blowing agent is for the purpose of blowing the sheets apart in selected areas during the subsequent cure of the stock. On the other hand, the talc serves to keep the stock in the individual sheets from flowing together in these selected areas during the handling of the materials before the cure takes place. Thereafter the talc serves no further or other purpose.

After the talc and blowing agent have been applied between the sheets 10, 11, the sheets are placed in juxtaposition and pressed together along spaced apart lines by running the sheets through the nip of the embossing rolls 13. In the embodiment shown in the drawing, these embossing rolls consist of a smooth surfaced lower roll 27 and an upper embossing roll 28 having ridges 29 projecting therefrom to form a closed design. The ridges 29 press the sheets 10 and 11 against the roll 27, so that in pressing against the two sheets 10, 11 the sheets are adhered together along spaced apart lines in the design of the embossing roll 28. Although embossing rolls have been shown in the drawing, other means may be used to press the sheets together. Thus the two sheets may be pressed together by hand in which case a hand foxing roller may be run over the sheets in several passes to form the design desired.

From the embossing means 13 the sheets 10, 11 are advanced by means of a conveyor belt (not shown) to a set of heating platens 14 where the laminated sheet is cured. These heating platens 14 are spaced to permit free blow of the cellular stock and to permit the sheets 10, 11 to be blown apart to form the tufts 17. These platens 14 may extend for a distance of from 30 to 50 feet to provide a continuous process, and it will be appreciated that if the platens extend for a longer distance, the laminated sheet may be moved therethrough at a greater rate of speed to provide the same curing effect thereon. It will also be appreciated that other curing means, such as a suitable oven, may be substituted for the heating platens 14.

A suitable recipe for making a masterbatch of sponge rubber stock to be used in this invention is as follows:

| Ingredients: | Parts by weight |
| --- | --- |
| Smoked sheet | 70 |
| GR–S | 25 |
| Calcium carbonate (filler) | 170 |
| Sodium bicarbonate (blowing agent) | 8.62 |
| Stearic acid | 8.62 |
| Zinc carbonate | 9.20 |
| Paraffin oil | 17.24 |
| Wax | 1.15 |
| Phenyl beta naphthyl amine | .60 |

This masterbatch is mixed in a Banbury using smoked sheet rubber and GR–S both of which have previously been masticated so that the rubber is of very low plasticity. The premastication of the rubber and GR–S is carried out at about 350° F. for 10 to 15 minutes so that the rubber will be quite soft to permit the blowing agent to expand it. The masterbatch is mixed in a Banbury mixer or on a mill for about 11 minutes. Care should be taken that the temperature is not allowed to exceed 210° F. during mixing else the sodium bicarbonate may blow prematurely.

A final compound is prepared having the following ingredients:

| Ingredients: | Parts by weight |
| --- | --- |
| Masterbatch | 100 |
| Tetramethylthiuram disulfide | .31 |
| Sulfur | 1.12 |
| p,p'-Oxybis(benzene sulfonyl hydrazide) (blowing agent) | .12 |
| Phthalic anhydride (retarder) | .12 |
| Palm oil | .5 |

This final mix is prepared by adding the ingredients listed to the masterbatch on a mixing mill. Again care is taken not to permit the temperature to exceed the blowing temperature of the blowing agents. This cellular compound is then led to the banks 19 and 20 and calendered into the sheet stock 10 and 11 having a thickness of .015" to .025" per sheet. It will be appreciated of course that although these sheets 10, 11 are formed of cellular compound at this stage, they are not yet a cellular material. Such a cellular compound merely carries within itself ingredients which on proper heating will evolve a gas to produce a cellular material therefrom when the compound is also cured.

The blowing agent added in the final stock, which is a nitrogen evolving blowing agent, is added in a small amount to aid the sodium bicarbonate. However, this blowing agent may be substituted for the sodium bicarbonate in the masterbatch, in which case it is added in quantities from ⅓ to ⅔ the weight given for sodium bicarbonate in the foregoing recipe for the masterbatch. Similarly other nitrogen evolving blowing agents, such as dinitrosopentamethylenetetramine, alpha, alpha'-azobisisobutyronitrile and similar compositions, may also be substituted for the sodium bicarbonate or other blowing agents.

The blowing agent supplied from the dusting means 12 is preferably sodium bicarbonate, and it is dusted on the sheets in quantities of from .03 pound to .08 pound per square yard. These limits are critical, for below .03 pound per square yard too little blowing takes place between the laminae, and above .08 pound per square yard there is a tendency to rupture the bond between the laminae. Talc is used in the same quantities, although there is nothing critical about the amount used. It is preferable to use as little talc as possible, for its purpose is merely to keep the sheets from flowing together at undesired areas during handling and until they are blown apart and cured. Nitrogen evolving blowing agents similarly may be substituted for the sodium bicarbonate which is dusted between the laminae, in which case from ⅓ to ⅔ of the weight of sodium bicarbonate is applied to the sheets depending upon the particular nitrogen evolving blowing agent used.

The embossed sheets are then subjected to a curing temperature of 350 to 360° F. for a period of about 8 minutes to complete the product. The density of the resulting product is in the order of 12 to 15 pounds per cubic foot. The sheets 10, 11 are blown during the cure to a thickness two to three times their original thickness, and the final thickness of the unitary laminated material 15 is ¼" to ⅜". This resulting product is a laminated sheet material which forms a thick rug underpadding having a luxurious feel, yet which has the firmness and resiliency necessary in these pads.

Having thus described my invention, what I claim and desire to protect by Letters Patent is:

1. The method of making a laminated article which comprises providing a plurality of sheets of uncured plastic stock containing a blowing agent, applying a gas evolving agent to a surface of at least one of these sheets, disposing the sheets adjacent one another so that the applied gas evolving agent is between two of the sheets, pressing the sheets together along lines that intersect and form inflatable areas between the sheets, and treating the sheets to form cellular material of the sheets and to evolve gas from the gas evolving agent between two of said sheets, thereby to blow the sheets apart in the areas between the lines where the sheets are pressed together.

2. The method of making a laminated tufted cellular material, which comprises applying talc and a blowing agent to the surface of at least one side of a sheet of uncured plastic compound containing a blowing agent, disposing the sheet opposite a second sheet of uncured plastic compound containing a blowing agent, with the applied talc and blowing agent disposed between the two sheets, pressing the sheets together along spaced apart lines, curing these sheets to form cellular material of the sheets and to generate from the blowing agent between the sheets a gas to separate the sheets between the spaced apart lines where the two sheets are joined together to give the cellular material a tufted appearance.

3. The method of making laminated tufted cellular rubber sheet material, which comprises forming two sheets of uncured rubber compound containing a gas evolving agent, dusting talc and a blowing agent over the surface of one side of one of these sheets, disposing the sheets opposite each other with the dusted side facing the other sheet, pressing the sheets together along spaced apart lines, and curing the sheets to form cellular rubber and to generate gas from the blowing agent between the sheets in the areas between these spaced apart lines to separate the sheets in these areas.

4. The method of making a cellular rubber rug underpadding which comprises forming two sheets of cellular rubber compound, dusting talc and sodium bicarbonate over one side of one of these sheets, disposing the sheets opposite each other with the dusted side facing the other sheet, embossing the sheets to press them together along spaced apart lines to form areas bounded by the lines, and subjecting the sheets to heat to blow and vulcanize the cellular rubber and to join the sheets at the spaced apart lines and to generate gas from the sodium bicarbonate between the sheets to separate the sheets in the areas between the spaced apart lines.

5. The method of making a laminated tufted rug underpadding of cellular material which comprises, providing two sheets of uncured compound containing a gas evolving agent, applying from .03 to .08 pound of sodium bicarbonate per square yard of surface area of one of said sheets to a surface thereof which is to face the other sheet, dusting talc over a similar surface, placing the sheets in facing relationship with the talc and sodium bicarbonate sandwiched between the sheets, pressing the sheets together along spaced apart lines to form a pattern of juncture between the sheets defining areas bounded by the spaced apart lines, and curing the sheets to vulcanize the sheets and vulcanize them together along the spaced apart lines and to generate gas from the blowing agent in the compound containing a gas evolving agent and from the sodium bicarbonate between the sheets to form cellular material and to blow the sheets apart in the areas bounded by the spaced apart lines, whereby a laminated tufted rug underpadding is formed having upper and lower laminae of cellular material joined along the spaced apart lines and having a gas in the areas bounded by the spaced apart lines holding the laminae separated in these areas.

6. The method of making a laminated tufted rug underpadding of cellular material which comprises, calendering two sheets of uncured cellular rubber compound having a thickness of .015" to .025", dusting one of the surfaces of one of said sheets with from .03 to .08 pound of sodium bicarbonate per square yard of surface area of said sheet, dusting talc over the surface area of one of said sheets, placing the sheets in facing relationship with the talc and sodium bicarbonate between the sheets, passing the sheets between a pair of embossing rolls to press the sheets together along spaced apart lines defining a pattern of juncture between the sheets to form areas bounded by the spaced apart lines, and vulcanizing the joined sheets under conditions which permit free blow of the materials in the sheets and to permit the sheets to be blown apart in the areas bounded by the spaced apart lines.

7. The method of making a laminated tufted cellular rubber material which comprises forming two sheets of cellular rubber compound, covering the surface of one side of one of the sheets with a small amount of talc and blowing agent, leading the sheets through a pair of embossing rolls to place them in abutting relation with the talc and blowing agent between the sheets and to press the sheets together at spaced apart lines, heating the pressed-together sheets to vulcanize the sheets together at the spaced apart lines and to blow the cellular rubber compound and to liberate gas from the blowing agent between the sheets which forms gas pockets separating the sheets in the areas bounded by the lines.

8. The method of making laminated tufted rubber sheeting, which comprises providing two sheets of uncured rubber, dusting a blowing agent over the surface of one side of one of these sheets, disposing the sheets opposite each other with the blowing agent between the sheets, pressing the sheets together along spaced apart lines, and curing the sheets to vulcanize them together along the spaced apart lines and evolving a gas from the blowing agent between the sheets to separate the sheets in the areas between the spaced apart lines.

9. The method of making a cellular rubber rug underpadding which comprises providing two sheets of uncured rubber containing a blowing agent, dusting talc and a gas evolving agent over one side of one of these sheets, disposing the sheets opposite each other with the dusted side facing the other sheet, pressing the sheets together at spaced apart points, subjecting the sheets to heat to blow and vulcanize the rubber compound and to join the sheets at the spaced apart points and to generate gas from the gas evolving agent between the sheets to separate the sheets in the areas between the spaced apart points.

References Cited in the file of this patent

UNITED STATES PATENTS

| | | |
|---|---|---|
| 1,088,551 | Dogny | Feb. 24, 1914 |
| 2,194,364 | Minor | Mar. 19, 1940 |
| 2,262,493 | Guinzburg | Nov. 11, 1941 |
| 2,303,198 | Cunnington | Nov. 24, 1942 |
| 2,633,442 | Caldwell | Mar. 31, 1953 |

FOREIGN PATENTS

| | | |
|---|---|---|
| 169,303 | Switzerland | May 31, 1934 |